United States Patent

Hartstone

[11] Patent Number: 5,884,764
[45] Date of Patent: Mar. 23, 1999

[54] DISC STORAGE ARRANGEMENT

[76] Inventor: Mark Gregory Hartstone, 41 Godden Crescent, Mission Bay, Auckland, New Zealand

[21] Appl. No.: 917,294

[22] Filed: Aug. 25, 1997

[51] Int. Cl.[6] .................................................. B65D 85/57
[52] U.S. Cl. ........................ 206/445; 206/308.1; 206/493
[58] Field of Search .................................. 206/232, 307, 206/308.1, 311–313, 493

[56] References Cited

U.S. PATENT DOCUMENTS

| | | | |
|---|---|---|---|
| 1,287,842 | 12/1918 | Betts | 206/311 |
| 1,683,479 | 9/1928 | Nystrom | 206/311 |
| 2,439,863 | 4/1948 | Segal | 206/311 |
| 4,736,840 | 4/1988 | Deiglmeier | 206/308.1 |
| 5,396,987 | 3/1995 | Temple et al. | 206/312 |
| 5,462,160 | 10/1995 | Youngs | 206/308.1 |
| 5,464,091 | 11/1995 | Callahan et al. . | |
| 5,513,749 | 5/1996 | Simmons | 206/308.1 |
| 5,531,320 | 7/1996 | Uchida | 206/311 |
| 5,692,607 | 12/1997 | Brosmith et al. | 206/232 |
| 5,706,938 | 1/1998 | Niehaus | 206/308.1 |

*Primary Examiner*—Jim Foster
*Attorney, Agent, or Firm*—Young & Thompson

[57] ABSTRACT

A disc storage arrangement includes an enclosure in which a number of substantially flat envelopes for containing discs can be mounted. The envelopes include at least one formation in an edge portion of resiliently deformable material and which formation is arranged to be clipped onto corresponding mounting parts provided in the enclosure.

18 Claims, 3 Drawing Sheets

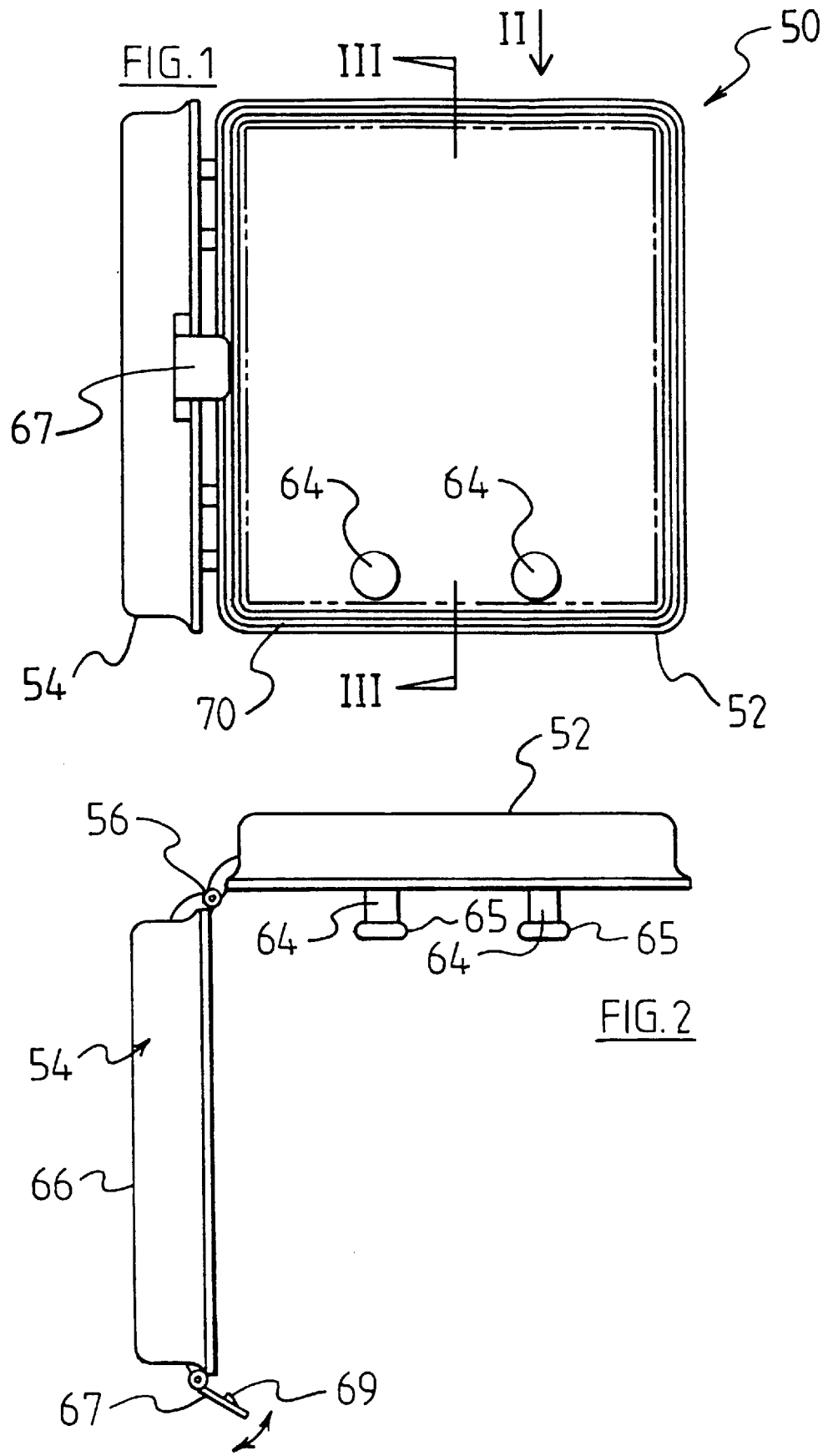

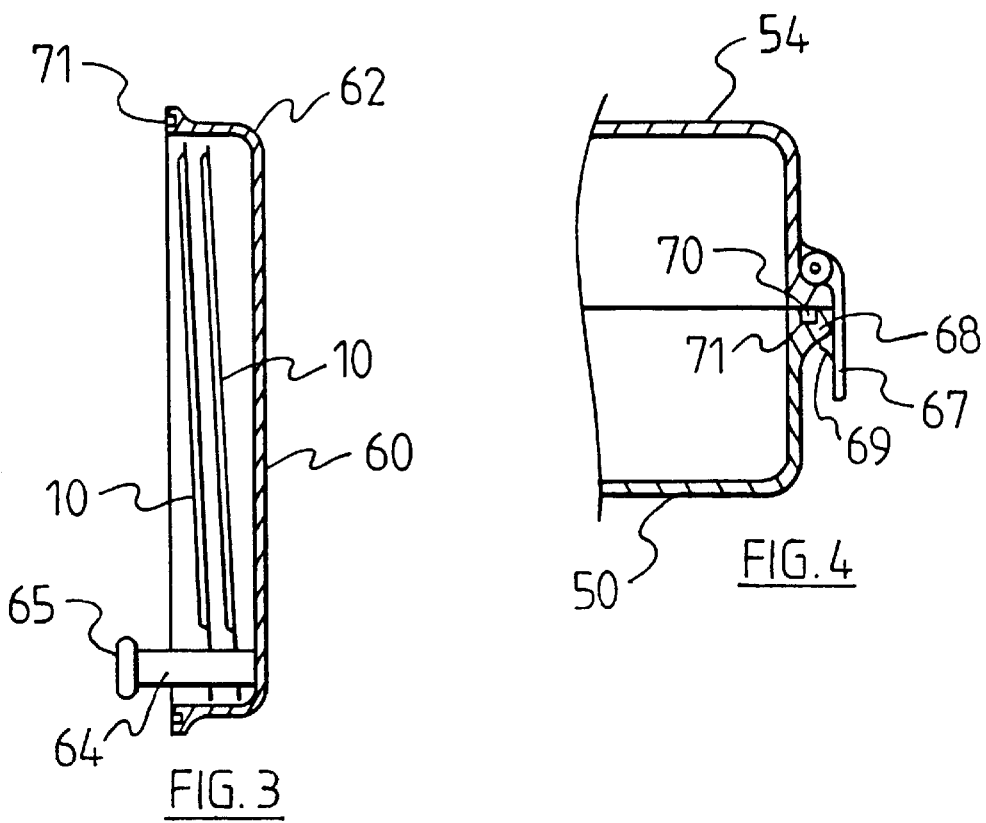
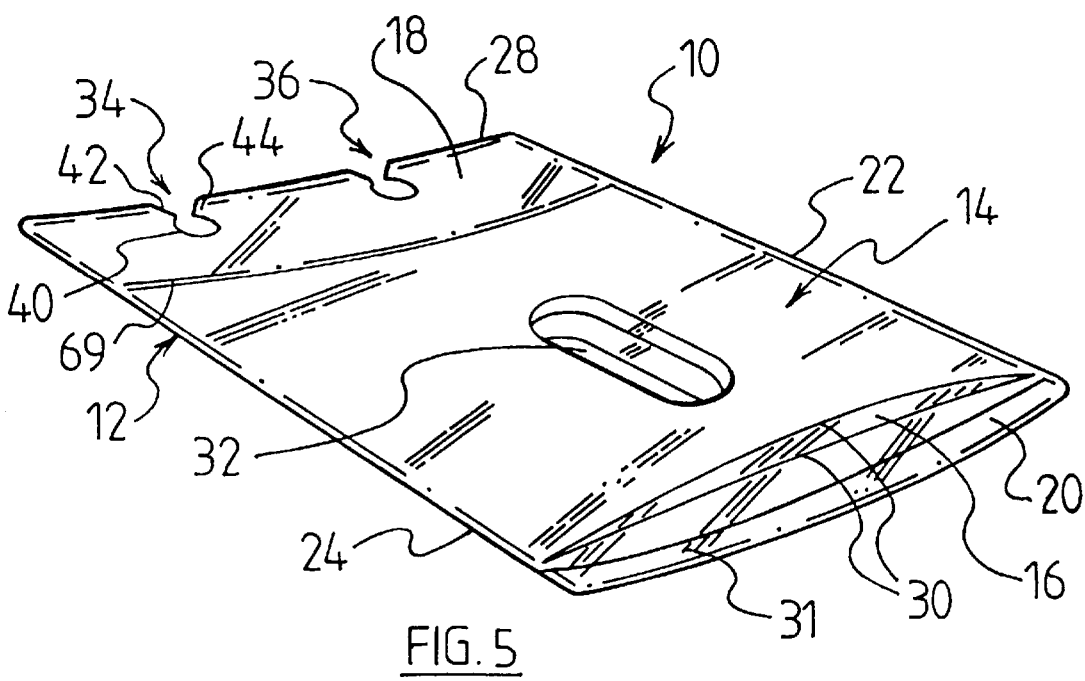

DISC STORAGE ARRANGEMENT

BACKGROUND OF THE INVENTION

This invention relates to storage arrangements for discs such as CD's (i.e. audio and video compact discs), CD-ROMs and the like. In this specification the term "disc" is intended to cover such discs and any other device analogous to discs of this kind which are presently known or which may be developed in the future and which is suitable for storage in the arrangement of the invention.

Holders of various types are known for storing individual discs including holders which are arranged to display a label, sheet or booklet bearing information about the contents of the disc stored therein. Holders are also known for storing numbers of discs. However, the currently known arrangements for holding discs are not especially well adapted for carrying them about and it is an object of the invention to provide an arrangement which can hold a number of discs securely and neatly or at least to offer the public an alternative disc storage arrangement.

In one aspect of the invention a disc storage arrangement comprises an enclosure in which a number of substantially flat envelopes for containing discs can be mounted by mounting means formed by inter-engaging part mounting means formed in the envelopes and in the enclosure.

In one form of the invention the mounting means formed by the part mounting means are arranged to hold the envelopes face to face in a stack in the enclosure. The part mounting means in the envelope may comprise at least one formation formed in an edge portion of each envelope which edge portion is of resiliently deformable material and which formation is arranged to be clipped onto a part mounting member provided in the enclosure.

The part mounting means in the enclosure may comprise a projection which is of substantially constant cross-sectional shape along its length and is disposed athwart the envelope, the formation in the edge of the envelope comprising a recess having a shape which is substantially complemental to the cross-sectional shape of the projection and has an opening at the edge the width of which opening is less than the width of the projection so that the parts of the envelope adjacent the recess yield resiliently when the envelope is clipped over the projection and hold the envelope on the projection in use.

The projection or projections are of cylindrical cross-section.

The part mounting means in the enclosure may alternatively comprise a recess which is of constant cross-sectional shape along its length and is disposed athwart the envelope, the formation in the edge of the envelope comprising a projection having a shape which is substantially complemental to the cross-sectional shape of the recess, the recess having an opening the width of which is less than the width of the projection so that the parts of the envelope at the ends of the projection yield resiliently when the envelope is clipped into the recess and hold the envelope on the projection in use.

The mounting means may comprise two or more of such recesses and projections spaced apart from each other.

The enclosure comprises a body in which the mounting means formed in the enclosure are located, the body having a generally flat portion disposed substantially parallel to the envelopes mounted therein and has peripheral portions which arise from the flat portion to define a cavity in which at least some of the envelopes are received.

The enclosure may also comprise a lid which engages the body, the shape of the lid being substantially similar to that of the body. The lid may or may not also be provided with said mounting means for the discs.

The envelope may comprise a disc-receiving, portion which is hinged to the edge portion in which said formation is formed.

The disc-receiving portion may comprise at least one outer wall which is constructed of a translucent material to enable a label inserted in the disc-receiving portion to be read.

The disc-receiving portion may comprise a first pocket in which the disc is received and a second pocket located adjacent the first pocket and separated therefrom by an intermediate wall, the label being receivable in the second pocket which comprises said at least one outer wall.

The walls of the disc-receiving portion may be provided with slots which are in register with one another and which enable the disc and/or the label to be gripped by the tips of fingers inserted through the slots on either side of the disc or label.

The above and other aspects of the invention are further discussed with reference to the accompanying drawings in which a disc holding apparatus is shown by way of example and in which:

DESCRIPTION OF THE DRAWINGS

FIG. 1: is a view in elevation of the disc holder, partially open;

FIG. 2: is a plan view, on Arrow II in FIG. 1, of the disc holder;

FIG. 3: is a sectional view, in Arrows III—III in FIG. 1, of the disc holder;

FIG. 4: is a cross section through the disc holder in the area of a catch between the base and end;

FIG. 5: is a perspective view of an envelope for mounting a disc in the disc holder, the upper end of the envelope being shown nearest the viewer;

DESCRIPTION

Figure 6:
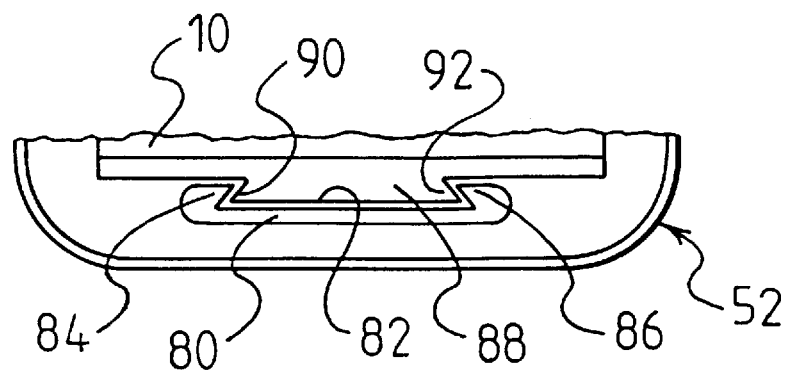
FIG. 6: is a view of part of a first modified disc holder.

It is convenient first to describe the envelope 10 shown in FIG. 5 The preferred envelope is comprised of two substantially rectangular sheets 12, 14 of plastics film joined together as described below with a third sheet 16 sandwiched therebetween. The second sheet 14 is of substantially the same size as the third sheet 16 and all of the sheets are of substantially the same width. However, the first sheet 12 is somewhat longer than the second and third sheets so that there are portions 18, 20 of the first sheet which project from the lower and upper ends respectively of the second and third sheets.

The sheets are joined together at their common side edges 22, 24 by any suitable known method such as high-frequency welding. By the same method, the second and third sheets are also joined together at their common lower edge 26. At this edge the second and third sheets are also joined to the first sheet along a line which is spaced from the lower edge 28 of the first sheet. The portion 18 of the first sheet extends from the common edge 26 to the edge 28.

The second and third sheets are not joined together along their common upper edge 30 nor is the third sheet joined at this common edge to the first sheet.

By virtue of this construction, there are two pockets formed in the envelope. The first pocket is formed between the first and third sheet and the second pocket is formed between the third and second sheets. The pockets have openings at the common upper edge 30. A CD audio (or other) disc can be placed in the first pocket and a label, lyric sheet or booklet describing the contents of the disc can be placed in the second pocket. Alternatively a disk could be placed in each pocket.

The sheets 12, 14 are of clear material so that disc and the label are visible therethrough. An area of material such as band 31 may be placed on the portion 20. The band 31 is preferably of material able to be written on so that the envelopes can be appropriately marked in use.

Slots are formed in the three sheets. The slots are of the same size and shape and are in register so that they define what can conveniently be described as a single slot 32 in the envelope. The slot 32 is located along the center line of the envelope and extends from the approximate center of the pockets to a position close to the common upper edge 30. Through the slot 32 the disc and/or the label can be gripped between the tips of a thumb and finger when they are to be inserted in or removed from the respective pockets.

One or more recesses, preferably two recesses 34, 36 are formed in the lower portion 18 of the first sheet. The recesses are of substantially similar shape and are spaced at equal distances one on either side of the center point of the lower edge 28 of the first sheet. In the example illustrated, each recess is of omega shape, comprising a substantially circular portion 40 and a flared portion 42 which extends between the circular portion 40 and the edge 38. Where the circular portion joins the flared portion the recess comprises a neck where it is narrower than it is at the center of the circular portion 40 and also adjacent the edge 38. The neck is defined by two parts 44 of the sheet 12 which project towards each other. The function of these parts 44 will be described.

The envelope is designed so that, particularly as regards its thickness, it does not take up substantially more space than a disc and a label placed in the respective pockets of an envelope.

In FIGS. 1 to 4, there is shown a disc holder 50 which is essentially a wallet-like enclosure of moulded plastics material. The holder 50 is beneficially somewhat stiffer than the envelopes and comprises a body 52 and a lid 54 which are respectively provided with integrally moulded hinge components 56. These hinge components interengage to hinge the lid to the body.

The body has a wall comprising a flat base portion 60 which is substantially co-extensive with an envelope 10. Around the periphery of the base portion, the wall curves at 62 through 90° so that the body has a dished shape and defines a space which can accommodate ten discs (or some other predetermined number of discs) packaged in envelopes 10 stacked together face-to-face.

One or more cylindrical pegs 64 are moulded integrally into the body. The number of pegs 64 equals the number of recesses 34, 36. The pegs project in the same direction as the curved peripheral portion 62 of the body wall and the height of each peg above the base portion is less than the distance from the base 60 to the flat top 66 of the lid 54 when the body is closed. The pegs are positioned so that, when an envelope is located at the center of the base portion 60, the pegs are aligned with the recesses 34, 36 in the envelopes. The diameter of each peg is marginally smaller than the diameter of the circular portion 40 of a recess so that the peg fits without excessive play into the circular portion.

The first sheet 12 of the envelope is thicker and than the second and third sheets. It is relatively stiff but nevertheless sufficiently resilient so that when an envelope is offered up lower edge 38 first to the pegs 64, the projecting parts 44 of the portion 18 will yield elastically to allow the envelope to be clipped over the pegs. In the process the pegs move into the circular portions 40 of the recesses. Once the pegs are located in the circular portions, the projecting parts 44 are stiff enough to hold the envelope on the pegs firmly enough to enable the envelope to stay on the pegs in normal use of the holder.

A capping piece 65 may be mounted on the end of each peg to prevent the envelopes from sliding off the pegs.

Except as described in what follows, the construction of the lid 54 is substantially similar to that of the body 52. However, in the present example, the lid is not provided with pegs 64 although it could be if desired. Furthermore the lid is provided with an integrally moulded latch portion 67 which engages a catch formation of 68 formed in the body to hold the lid closed against the body. The latch 67 is pivotally connected to the lid or the base, in the embodiment shown the latch 67 is connected to the lid. The latch includes a dent or rib 69 which engages the base 50. The catch formation can be a substantially shaped channel or rib on the base 50 at 68.

The base 50 and/or the lid 54 carries a seal, preferably an "Oring" 70 positioned in peripheral channel 71 in the base so that a dust and/or water seal is provided when the lid is closed.

A stack of the envelopes can be mounted on the pegs. It is an advantage of the arrangement that the envelopes do not have to be removed from the pegs in order to view the labels or to remove the discs from the envelopes. To assist with this a hinge line 69 is formed in each envelope at the lower edge 26 by well known techniques. The user can flick through the envelopes in a stack, the envelopes pivoting forward one at a time about their hinge lines 69 in the process.

One example of a modification to the above described arrangement is shown in FIG. 6. Here the pegs 64 are replaced by an elongate boss 80 which arises from the flat base portion 60 of the body. A recess 82 is formed in the boss. The recess has an opening at its upper end where it has two parts 84, 86 which project towards each other so that at the opening it is narrower than at its base. The lower portion 18 of the envelope is, in this case provided with a formation 88 which projects downwardly from its lower edge 38. The shape of the formation 88 is complemental to that of the recess, the formation 78 having at its ends two projecting parts 90, 92 which yield when the envelope is offered up to the boss and lodge behind the respective parts 84, 86 to hold the envelope clipped into the recess 82.

Figure 7:
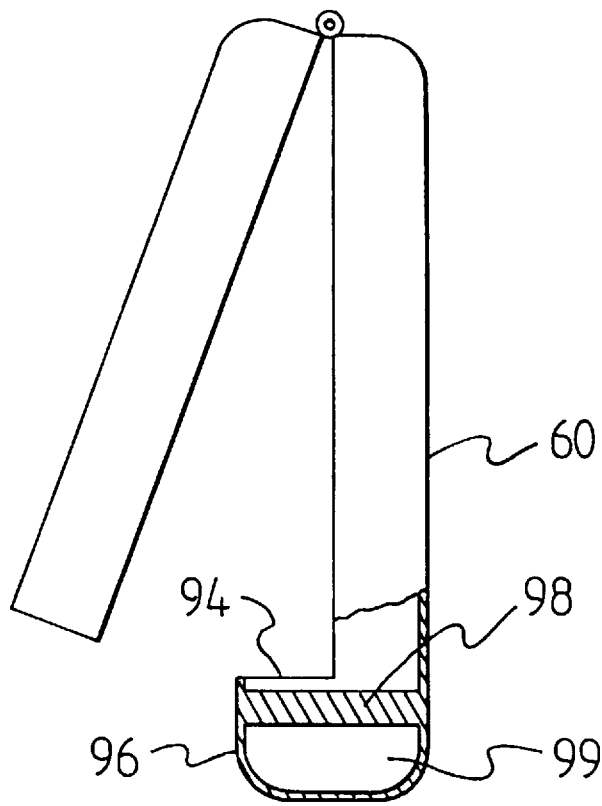
FIG. 7: is a view of part of a second modified disc holder and a modified envelope.

In a second modification shown in FIG. 7 the lid is hinged to the body along the upper edge thereof and terminates at a position 94 in horizontal alignment with the hinge lines 69 of the envelopes stacked in the holder. The body moulding is continued upwards as at 96 from its lower end and terminates adjacent the position 94. The body is provided with pegs 98 which are moulded integrally with both the flat base portion 60 and the opposing portion 96. The lower portions 18 of the envelopes are received into the trough-shaped space 99 between the portions 60 and 96 of the body when the envelopes are clipped onto the pegs 98.

These modifications illustrate that a wide variety of modifications may be made to the holder and envelopes illustrated which remain within the scope of the invention. In particular, the means for clipping the envelopes on the pegs may be modified.

It is not intended that the scope of a patent granted in pursuance of the application of which this specification forms a part should exclude modifications and/or improvements to any matter described and/or illustrated herein which are within the scope of the invention or be limited by such matter further than is necessary to distinguish the invention from the prior art.

I claim as my invention:

1. A disc storage arrangement comprising an enclosure, plural substantially flat envelopes mounted therein for containing discs, and mounting means, said mounting means comprising part mounting means in said enclosure for receiving, holding, and releasing said envelopes within said enclosure without moving said part mounting means; and said mounting means further comprising interengaging part mounting means in each of said envelopes for engaging said part mounting means and for individually engaging and disengaging each of said envelopes and said part mounting means without disengaging any others of said plural envelopes from said part mounting means and without moving said part mounting means.

2. A disc storage arrangement as claimed in claim 1 where the mounting means formed by the part mounting means are arranged to hold the envelopes face to face in a stack in the enclosure.

3. A disc storage arrangement as claimed in claim 1 wherein said interengaging part mounting means comprises at least one formation formed in an edge portion of each of said envelopes which is of resiliently deformable material and is constructed and arranged to be clipped onto said part mounting member in the enclosure.

4. A disc storage arrangement as claimed in claim 3 wherein the part mounting means in the enclosure comprises a projection which is of substantially constant cross-sectional shape along its length, the at least one formation comprising a recess having a shape which is substantially complemental to the cross-sectional shape of the projection and has an opening at the edge, the width of which opening is less than the width of the projection so that edges of the recess yield resiliently when the recess is clipped onto the projection.

5. A disc storage arrangement as claimed in claim 4 wherein the projection has a cylindrical cross-section.

6. A disc storage arrangement as claimed in claim 3 wherein said part mounting means in the enclosure comprises a recess which is of constant cross-sectional shape along its length, the at least one formation comprising a projection having a shape which is substantially complemental to the cross-sectional shape of the recess, the recess having an opening the width of which is less than the width of the projection so that the ends of the projection yield resiliently when the projection is clipped into the recess.

7. A disc storage arrangement as claimed in claim 4 wherein the mounting means may comprise two or more of said recesses and projections spaced apart from each other.

8. A disc storage arrangement as claimed in claim 1 wherein the enclosure comprises a body in which the part mounting means in the enclosure are located, the body having a generally flat portion disposed substantially parallel to the envelopes mounted therein and has peripheral portions which arise from the flat portion to define a cavity in which at least some of the envelopes are received.

9. A disc storage arrangement as claimed in claim 8 wherein the enclosure also comprises a lid which engages the body, the shape of the lid being substantially similar to that of the body.

10. A disc storage arrangement as claimed in claim 3 wherein said envelopes each comprises a disc-receiving portion which is hinged to the edge portion in which said formation is formed.

11. A disc storage arrangement as claimed in claim 10 wherein the disc-receiving portion may comprise at least one outer wall which is constructed of a translucent material to enable a label inserted in the disc-receiving portion to be read.

12. A disc storage arrangement as claimed in claim 11 wherein the disc-receiving portion comprises a first pocket for receiving a disc and a second pocket located adjacent the first pocket and separated therefrom by an intermediate wall and which comprises said at least one outer wall.

13. A disc storage arrangement as claimed in claim 10 wherein walls of the disc-receiving portion comprise slots which are in register with one another for removing a disc.

14. A disc storage arrangement as claimed in claim 1 wherein the envelopes each comprise a panel for being marked.

15. A disc storage system comprising:

an enclosure comprising, a rigid bottom cavity having a flat bottom with four sides ascending therefrom, a rigid top cavity having a flat top with four sides descending therefrom, a hinge for pivotally joining said top and bottom cavities, and plural spaced apart cylinders affixed axially perpendicular to said flat bottom, each of said cylinders comprising a free end having a top knob with an outer diameter larger than an outer diameter of said cylinders, said top knob extending into said top cavity when said enclosure is closed; and plural flat envelopes, each of said envelopes comprising, three sheets of flexible material, a first one of said three sheets being thicker and longer than the other two of said three sheets, said three sheets being joined at their sides and at one end to form two pockets which correspond in size to said flat bottom of said bottom cavity, one of said pockets for receiving a disc, said first sheet having an elongated portion extending from said one end, said elongated portion having plural recesses in a distal end thereof which correspond to said plural cylinders of said enclosure, each of said recesses comprising a circular opening having a diameter that is about the same as the outer diameter of said cylinders and a notch joining said distal end to said circular opening, said notch having a minimum width that is less than the outer diameter of said cylinders, whereby any of said envelopes can be individually engaged in any order on said cylinders and disengaged from said cylinders without disengaging any others of said envelopes from said cylinders and without changing a position of said cylinders.

16. The system of claim 15, wherein said top and bottom cavities are substantially the same size and shape.

17. The system of claim 17, wherein said notch has a width at said distal end that is about the same as the diameter of said cylinders.

18. A disc storage system comprising:

an enclosure comprising, a rigid bottom cavity having a flat bottom with four sides ascending therefrom, one of said sides comprising an extension that extends back over a portion of said flat bottom, a rigid top cavity having a flat top with sides descending therefrom, except at a side corresponding to said one side with said extension, a hinge for pivotally joining said top and bottom cavities at a side opposite said extension, and plural spaced apart cylinders extending axially perpendicular to said flat bottom that each have one end affixed to said flat bottom and another end affixed to said extension; and plural flat envelopes, each of said envelopes comprising, three sheets of flexible material, a first one of said three sheets being thicker and longer than the other two of said three sheets, said three sheets being joined at their sides and at one end to form two pockets which correspond in size to said flat bottom of said bottom cavity, one of said pockets for receiving a disc, said first sheet having an elongated portion extending from said one end, said elongated portion having plural recesses in a distal end thereof which correspond to said plural cylinders of said enclosure, each of said recesses comprising a circular opening having a diameter that is about the same as the outer diameter of said cylinders and a notch joining said distal end to said circular opening, said notch having a minimum width that is less than the outer diameter of said cylinders, whereby any of said envelopes can be individually engaged in any order on said cylinders and disengaged from said cylinders without disengaging any others of said envelopes from said cylinders and without moving said cylinders.

* * * * *